(No Model.)
G. W. BUDD.
SHIRT OR OTHER STUD.
No. 549,434.
Patented Nov. 5, 1895.
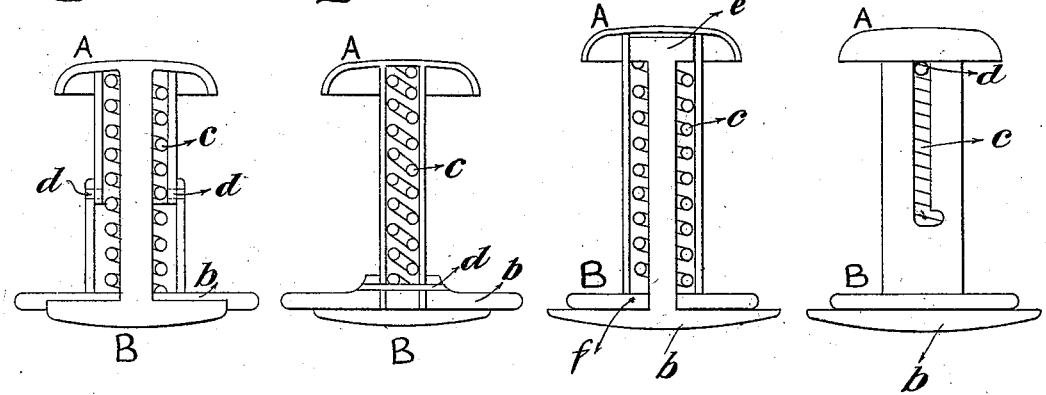
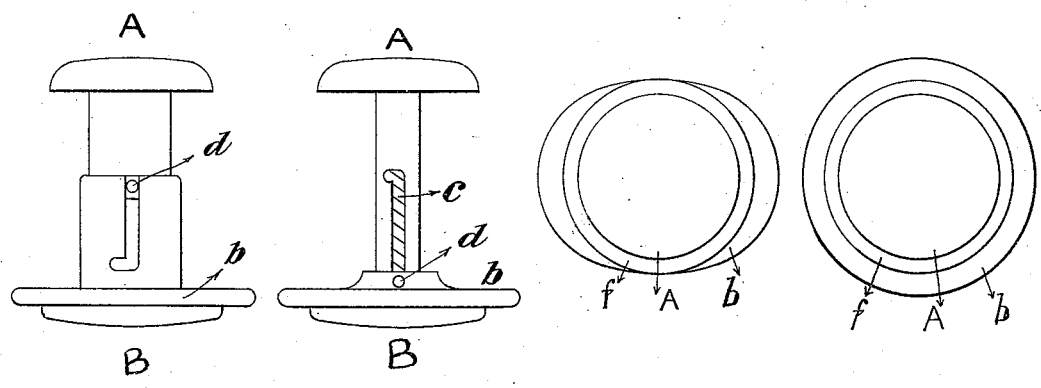
Witnesses,
W. Nicholetts
J. Risley
Inventor
George William Budd

UNITED STATES PATENT OFFICE.

GEORGE WILLIAM BUDD, OF LONDON, ENGLAND.

SHIRT OR OTHER STUD.

SPECIFICATION forming part of Letters Patent No. 549,434, dated November 5, 1895.

Application filed June 13, 1895. Serial No. 552,656. (No model.) Patented in England September 6, 1893, No. 16,774, and June 1, 1894. No. 10,645.

*To all whom it may concern:*

Be it known that I, GEORGE WILLIAM BUDD, a subject of the Queen of Great Britain, residing at 127 Long Acre, in the city of London, England, have invented a new and useful Improvement in Shirt or other Studs, Solitaires, and Buttons, (for which I have obtained patents in Great Britain, No. 16,774, bearing date of September 6, 1893, and No. 10,645, bearing date of June 1, 1894,) of which the following is a specification.

My invention relates to improvements in shirt or other studs, solitaires, and buttons, (hereinafter called "studs") and the object of this invention is that one part or thickness of the shirt or garment or article to be buttoned shall be firmly gripped or held between two flanges, one of which is movable, thus preventing the loss of the stud, as often occurs when studs of ordinary construction are used.

The studs, instead of consisting only of a head and a back connected by a stem in the usual manner, solidly or otherwise, have interposed on the stem between the head and the back a movable piece, which may be a disk or flange circular, elliptical, or of any other convenient shape, or a bar, or the stud has a movable flange, also of any convenient shape, and a stem which is inserted in the stem of the stud from the back, which is made hollow or tubular to receive it. I also provide a means for holding the disk or flange or the movable back and stem in contact preferably by means of a spiral or other spring, with arrangements to cover the spring entirely or partially, and I also provide means to hold the flange and back or the movable and other back apart while inserting the studs. I attain this object by means of the constructions illustrated in the accompanying drawings, in which—

Figures 1 and 2 show sections of the stud with the movable or sliding flange, and Figs. 3 and 4 are a section and an elevation of the stud with a movable back. Figs. 5 and 6 are elevations of Figs. 1 and 2; and Figs. 7 and 8 are views in plan of Figs. 3 and 4; but they would apply equally well to Figs. 1 and 2.

Similar letters refer to similar parts throughout the several views.

In Fig. 1, A B is the stud as usually constructed, $b$ is the movable disk or flange, and C is a spiral spring keeping the flange $b$ in contact with the back B, and is the method I prefer to employ. Both the head of the stud and the flange have short tubular parts attached, completely concealing the spring and sliding telescopically one within the other when the spring is compressed.

Fig. 2 shows the stud with the stem hollow or tubular to contain the spring, and a pin $d$, passing through the stem and attached to the flange, slides in slots in the stem, compressing the spring and serving also as a means of holding the back and flange apart, temporarily, by means of the bayonet-joints in which the slots terminate.

Fig. 3 shows the stud with the stem hollow, as in Fig. 2. $b$ is the movable back with a stem attached to it, surrounded by a special spring C, supported between the enlarged end of the stem $e$ and a shoulder or ridge $f$ in the back of the stud B. Fig. 4 is a similar arrangement shown in elevation, but with a pin $d$ inserted in the head of the movable stem and working in the slots in the ordinary stem, and when the back is drawn out and partly turned the pin engages in the bayonet-joints in which the slots terminate and holds the backs temporarily apart for convenience of insertion.

Fig. 5 is an elevation of Fig. 1, showing the slots, the pin $d$, and bayonet-joint for holding the flange and back apart. Fig. 6 is an elevation of Fig. 2, showing the same.

Figs. 7 and 8 are plans of Figs. 3 and 4, but serving also to illustrate Figs. 1 and 2. In Fig. 7 the movable flange is elliptical, and in Fig. 8 the movable back is circular.

In using the movable flange I prefer to make it slightly larger than or of a different shape to that of the back of the stud, and in using the movable back I prefer to make it slightly larger or of a different shape to the back of the stud for convenience in separating the parts and holding the studs while inserting them, and I also prefer to make the movable flange or the movable back slightly hollow or dished, as shown in Fig. 1, as I find it improves the grip of the flanges.

I make the studs of any suitable material, such as gold, silver, aluminium, mother-ofpearl, bone, ivory, or any other materials usually employed for shirt-studs and solitaires, or of iron, steel, brass, nickel, or any other suitable materials. When the studs are to be employed for other purposes—such as buttons for cloth, leather, or heavier articles—the studs may be made of any one material throughout or of any two or more in combination.

When the stud is inserted, one thickness of the shirt, garment, or other article is held firmly between the back of the stud and the movable flange or between the back of the stud and the movable back and the other thickness is buttoned over in the usual manner. This insures a permanent hold and yet provides an easy means of removing the studs or buttons when desired.

What I claim as my invention, and desire to secure by Letters Patent, is—

1. In a stud, a head, a base and a rigidly connecting stem, in combination with a movable clamping flange and stem, a spring which normally holds the movable flange in contact with the fixed base, and a tube inclosing the spring, a bayonet jointed slot in the tube and a pin on one of the stems which moves in said slot whereby the clamping flange may be held apart from the base, the stud as a whole being non-separable, substantially as described.

2. In a stud, a head, a base and a rigidly connecting stem, in combination with a movable clamping disk mounted on said stem between the head and the base, a coil spring around said stem and butting against said clamping disk and normally holding the clamping disk in contact with the fixed base, a tubular piece fixed to the head and projecting downward, a tubular piece fixed to the clamping flange and projecting upward, the two tubular pieces telescoping with each other and inclosing said spring, the stud as a whole being non-separable, substantially as described.

3. In a stud, a head, a base and a rigidly connecting stem, in combination with a movable clamping disk mounted on said stem between the head and the base, a coil spring around said stem and butting against said clamping disk and normally holding the clamping disk in contact with the fixed base, a tubular piece fixed to the head and projecting downward, a tubular piece fixed to the clamping flange and projecting upward, the two tubular pieces telescoping with each other and inclosing said spring, one of the tubular pieces having a bayonet jointed slot and the other tubular piece having a pin which slides in said slot whereby the movable flange may be temporarily held apart from the fixed base, the stud as a whole being non-separable, substantially as described.

4. In a stud, a head, a base and a rigidly connecting stem, in combination with a movable clamping disk mounted on said stem between the head and the base and of larger diameter than the fixed base, a coil spring around said stem and butting against said clamping disk and normally holding the clamping disk in contact with the fixed base, a tubular piece fixed to the head and projecting downward, a tubular piece fixed to the clamping flange and projecting upward, the two tubular pieces telescoping with each other, and inclosing said spring, one of the tubular pieces having a bayonet jointed slot, and the other tubular piece having a pin which slides in said slot whereby the movable flange may be temporarily held apart from the fixed base, the stud as a whole being non-separable, substantially as described.

GEORGE WILLIAM BUDD.

Witnesses:
W. NICHOLETTS,
J. RISLEY.